UNITED STATES PATENT OFFICE 2,495,799

CHLOROALKYL PHOSPHOROUS OXY AND SULFODICHLORIDES

Willard H. Woodstock, Flossmoor, Ill., assignor to Victor Chemical Works, a corporation of Illinois No Drawing. Application May 17, 1945,
Serial No. 594,370

9 Claims. (Cl. 260—543)

This invention relates to addition products of certain olefins and $PCl_5$, and to the reaction products of such addition products with $P_2O_5$ and $P_2S_5$.

As shown in my co-pending application, Serial No. 590,956, filed April 28, 1945, now Patent No. 2,471,472, unsymmetrical olefins having a terminal double bond react with $PCl_5$ to form phosphorus addition products and these addition products may then be reacted with phosphorus pentoxide and phosphorus pentasulfide to form organic phosphorus oxydichlorides and sulfodichlorides.

Olefins which have two alkyl groups or an aryl group attached to the 2-carbon generally react with phosphorus pentachloride to add —Cl to the 2-carbon and —$PCl_4$ to the 1-carbon. Olefins which have hydrogen and only one alkyl group on the 2-carbon atom generally react with phosphorus pentachloride to add —$PCl_4$ to the 2-carbon atom and —Cl to the 1-carbon atom.

To form the oxydichlorides and sulfodichlorides of this invention the organic —$PCl_4$ products are reacted with $P_2O_5$ and $P_2S_5$ as shown in equations (A) and (B) below:

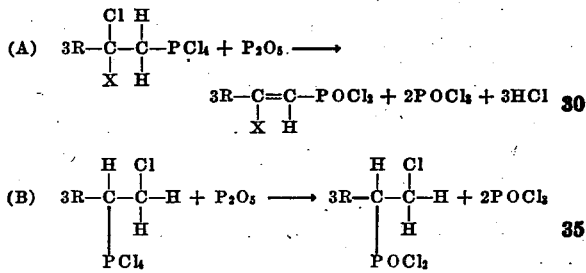

$P_2S_5$ may be substituted for $P_2O_5$ in the above equations.

Reaction products of the type A equation have lost HCl and are alkenyl 1-phosphorus oxy- and sulfodichlorides, while reaction products of the type B equation retain a chlorine atom on the 1-carbon and are chloroalkyl 2-phosphorus oxy- and sulfodichlorides.

The products of either reaction may be separated by distillation and the organic phosphorus oxydichlorides may then be reacted with alcohols or phenols to produce esters, with inorganic bases to form salts, with ammonia and amines to produce amides, and with water to produce phosphonic acids.

Esters derived from esterifying reactions with the products of equation (A) are unsaturated alkenyl-1-phosphonic acid esters, while those derived from the products of equation (B) are esters of saturated chloroalkyl 2-phosphonic acids. Such above methyl esters of chloroalkyl phosphonic acid and alkenyl-1-phosphonic acid are new compounds as are the phosphorus oxydichloride compounds themselves.

In equation (A) R represents an alkyl or aryl group, and X represents alkyl or aryl group or, hydrogen only when R is an aryl group.

In equation (B) R is an alkyl group. It is possible that products of the (A) type reaction may contain small percentages of (B) material, and vice versa.

Olefins of the type which include propylene, butene-1, pentene-1, octene-1, and the like are believed to react in accordance with equation (B), and the subsequent examples are illustrated on this basis though I do not wish to exclude the possibility of reaction products being formed with the chlorine atom on the 2-carbon and the phosphorus group on the 1-carbon. The essential point is that with olefins of the type herein described, stable reaction products are obtained having a chlorine atom and the phosphorus group attached to different carbon atoms of the 1—2 group of carbon atoms of the original olefin.

The following are examples of the process and products:

Example I

In a 2 liter 3-necked flask, 125 g. butene-1 (2 g. moles+10% excess) was dissolved in 1200 cc. dry benzene and cooled with an ice bath. 417 grams phosphorus pentachloride was added at 0° to 5° C. and the charge stirred for 6 hours at this temperature to complete the addition reaction. Without removing the addition compound from the benzene medium, 106 grams phosphoric anhydride was added and the slurry agitated at room temperature for 5 hours, at 35° C. for 4 hours, and at 50° C. for 9 hours. After filtering the solution was heated under vacuum to evaporate off the benzene solvent. On further heating phosphorus oxychloride was distilled off and the product which distilled over from 116–123° C. at 18 mm. pressure was recovered. It was a water-white liquid and weighed 224 grams which represented a yield of 53.5%. It analyzed 15.4% P, 49.5% Cl and corresponded substantially to the 1-chlorobutyl-2-phosphorus oxydichloride of the formula

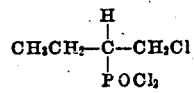

Example II

In a 2 liter 3-necked flask, 81.5 grams pentene-1 (1 gram mole at 95% purity plus 10% excess) was dissolved in 1200 cc. dry benzene and cooled to below 10° C. with an ice bath. 208.5 grams (1 gram mole) phosphorus pentachloride was slowly added while stirring. A white, thickened slurry of addition compound formed which was allowed to warm up to room temperature.

To the addition compound prepared in the above manner, 55 grams phosphoric anhydride was added. The charge was stirred 2 hours at room temperature, 3 hours at 35° C., and 3 hours at 50° C. The excess phosphoric anhydride was filtered off, and the solution heated under vacuum to remove the phosphorus oxychloride and benzene solvent. On further heating a crude distillate was collected between 115° and 138° C. at 18 mm. pressure. On redistillation the purified product obtained was a colorless liquid which solidified on cooling. The 1-chloroamyl-2-phosphorus oxydichloride product obtained had a melting point of 39–42° C., a boiling point of 130–132° C. (20 mm. pressure), and a specific gravity of 1.319 at 25° C. Analysis of the product corresponded to the formula:

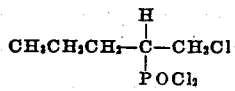

Example III 1-chloropropyl-2-phosphorus oxydichloride was prepared as follows: 208.5 grams phosphorus pentachloride was suspended in 1200 cc. dry benzene and 160 grams gaseous propylene bubbled into the mixture over a period of 11 hrs. while stirring and maintaining the temperature at about 20° C.

To the propylene-phosphorus pentachloride addition compound prepared in the above manner was added 55 grams of phosphoric anhydride, and the charge stirred 3 hours at room temperature, 3 hours at 35° C., and 4 hours at 50° C. The charge became clear, and after filtering it was distilled at atmospheric pressure. The benzene solvent distilled over between 40 and 90° C. Phosphorus oxychloride came over between 92 and 116° C. The third fraction distilling over between 125 and 218° C. was redistilled, substantially all of the product being collected between 190 and 218° C. at atmospheric pressure. The product was a clear liquid analyzing 16.6% P, 53.0% Cl, and represented substantially the 1-chloro-propyl-2-phosphorus oxydichloride indicated by the formula

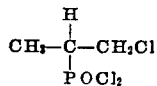

The 1-chloroalkyl-2-phosphorus oxydichloride compounds prepared as in the above examples may be reacted with alcohols and phenols to produce esters, with amines to produce amides, and with water to produce chloroalkyl phosphonic acids.

The following example illustrates the method of making the alkyl esters of the 1-chloroalkyl-2-phosphonic acids.

Example IV

The dibutyl ester of 1-chloroamyl-2-phosphonic acid was prepared by reacting the 1-chloroamyl-2-phosphorus oxydichloride of Example II with an excess of butanol under anhydrous conditions. 150 grams of the chloroamyl phosphorus oxydichloride was mixed with 200 grams of anhydrous butanol and stirred for 25 minutes while maintaining the temperature at about 25–30° C. The mixture was then heated at about 55° C. for 6 hours while completing the evolution of the HCl. The excess butanol was evaporated off and the residual liquid distilled at about 160° C. at 20 mm. pressure. It was redistilled at 4 mm. pressure and the fraction boiling between 154° and 162° C. collected as the desired product. The dibutyl 1-chloroamyl-2-phosphonate ester thus obtained is a colorless liquid having a specific gravity of 1.106 at 25° C. and a melting or solidifying point of below −70° C. Analysis of the product corresponded substantially to the formula

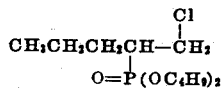

Chloroalkyl phosphonic acids may be prepared by reacting the chloroalkyl phosphorus oxydichlorides with water in accord with the following type reaction:

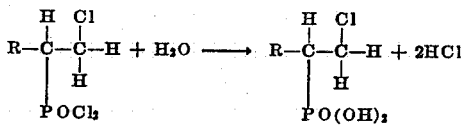

The reaction conditions shown in the above examples may be varied without departing from the principles of the invention. For example, in the preparation of the addition product and oxydichloride compounds, instead of a benzene reaction and solvent medium, other inert solvents such as toluene, carbon tetrachloride, phosphorus oxychloride, the chlorinated hydrocarbons, an excess of the unsaturated starting hydrocarbon, etc. may be used. Also, it is possible to carry out the reactions without the use of solvents by proper selection of mechanical mixing devices and reaction vessels. Also, the temperatures employed may be varied according to the nature of the reactants, but should at all stages be held below the decomposition point of the reactants and products. Lower temperature limits are not critical.

The oxy- and sulfodichloride compounds produced in accordance with the above procedure are valuable intermediates for the production of new phosphonic acids, esters, amides, salts, etc.

The chloroalkyl phosphonate esters may be used as oil treating agents, flameproofing agents for textiles, as fire-retarding plasticizers, etc.

The 1-chloroalkyl-2-phosphorus tetrachloride resulting from the initial addition reaction can be separated as a hygroscopic, crystalline intermediate product, but may be advantageously employed in the preparation of the oxy- and sulfodichlorides without separation from the reaction medium.

The foregoing detailed description has been given for clearness of understanding only, and no unnecessary limitations should be understood therefrom.

What I claim as new, and desire to secure by Letters Patent, is:

1. A chloroalkyl phosphorus oxydichloride where a chlorine atom and the phosphorus atom are attached to adjacent carbon atoms one of which is the terminal carbon of a straight chain alkyl group containing more than two carbon atoms.

2. A chlorobutyl phosphorus oxydichloride in which the butyl group is a straight chain and a chlorine atom and the phosphorus atom are attached to adjacent carbon atoms one of which is the terminal carbon of the butyl group.

3. A chloroamyl phosphorus oxydichloride in which the amyl group is a straight chain and a chlorine atom and the phosphorus atom are attached to adjacent carbon atoms one of which is the terminal carbon of the amyl group.

4. A product as set forth in claim 1, in which the chlorine is attached to the 1-carbon atom and the phosphorus to the 2-carbon atom.

5. A product as set forth in claim 2, in which the chlorine is attached to the 1-carbon atom and the phosphorus to the 2-carbon atom.

6. A product as set forth in claim 3, in which the chlorine is attached to the 1-carbon atom and the phosphorus to the 2-carbon atom.

7. The method of preparing a chloroalkylphosphorus chloride compound which comprises mixing phosphorus pentachloride and an excess of an olefin of the type $RCH=CH_2$, where R is an alkyl radical, in an inert solvent, maintaining the reaction mixture at a temperature of less than 20° C. until the addition reaction is complete, then adding an acidic anhydride selected from the class consisting of $P_2O_5$ and $P_2S_5$, heating to complete the reaction and separating the chloroalkylphosphorus chloride compound from the reaction mixture.

8. The method of claim 7 wherein the acidic anhydride is $P_2O_5$.

9. The method of claim 7 wherein the acidic anhydride is $P_2S_5$.

WILLARD H. WOODSTOCK.

REFERENCES CITED

The following references are of record in the file of this patent:

UNITED STATES PATENTS

| Number | Name | Date |
|---|---|---|
| 2,365,466 | Hamilton | Dec. 19, 1944 |
| 2,389,576 | Kosolapoff | Nov. 20, 1945 |

OTHER REFERENCES

Bergmann, "Ber. Deut. Chem. Gesell.," vol. 63B, pp. 1158–1173 (1930); vol. 64B, pp. 1455–1480 (1931).

Bergmann et al., "Ber. deutsch Chem. Ges.," vol. 66, pp. 286–291 (1933).

Arbuzov, "Chem. Abstracts," vol. 30, pp. 4813–4814 (1936).

Kosolapoff, "Jour. Am. Chem. Soc.," vol. 66, pp. 109–111; 1511 and 1512 (1944).